United States Patent
Kneckt et al.

(10) Patent No.: US 9,681,371 B2
(45) Date of Patent: Jun. 13, 2017

(54) IMPROVING COMMUNICATION EFFICIENCY

(71) Applicant: Nokia Technologies Oy, Espoo (FI)

(72) Inventors: Jarkko Lauri Sakari Kneckt, Espoo (FI); Teemu Savolainen, Nokia (FI); Markus Isomaki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/772,807

(22) PCT Filed: Mar. 8, 2013

(86) PCT No.: PCT/FI2013/050256
§ 371 (c)(1),
(2) Date: Sep. 4, 2015

(87) PCT Pub. No.: WO2014/135743
PCT Pub. Date: Sep. 12, 2014

(65) Prior Publication Data
US 2016/0014685 A1    Jan. 14, 2016

(51) Int. Cl.
*H04W 48/18* (2009.01)
*H04W 76/02* (2009.01)
*H04W 48/20* (2009.01)

(52) U.S. Cl.
CPC ......... *H04W 48/18* (2013.01); *H04W 76/02* (2013.01); *H04W 48/20* (2013.01)

(58) Field of Classification Search
CPC ...... H04W 48/18; H04W 76/02; H04W 48/20
USPC .......... 455/422.1, 435.1, 436–439, 443–446; 370/331, 332
See application file for complete search history.

(56) References Cited

U.S. PATENT DOCUMENTS

| 5,371,734 A * | 12/1994 | Fischer | H04W 52/0274 370/311 |
| 6,075,990 A * | 6/2000 | Shin | H04W 36/06 455/439 |
| 6,954,616 B2 * | 10/2005 | Liang | H04W 72/1215 370/329 |
| 2002/0194367 A1 * | 12/2002 | Nakamura | H04L 12/2856 709/238 |
| 2005/0265308 A1 * | 12/2005 | Barbir | H04L 12/4641 370/351 |

(Continued)

FOREIGN PATENT DOCUMENTS

| EP | 2 306 766 A1 | 4/2011 |
| WO | WO 2008/105771 A1 | 9/2008 |
| WO | WO 2012/015411 A1 | 2/2012 |

OTHER PUBLICATIONS

Kandula, Srikanth, et al., "FatVAP: Aggregating AP Backhaul Capacity to Maximize Throughput", USENIX Association, NSDI '08, Apr. 16-18, 2008, San Francisco, CA, USA, 5th USENIX Symposium on Networked Systems Design and Implementation, 15 pgs.

*Primary Examiner* — Cong Tran
(74) *Attorney, Agent, or Firm* — Harrington & Smith

(57) ABSTRACT

There is provided a method including detecting, by an apparatus, a first wireless access option; determining whether or not the first wireless access option shares at least part of a backbone with a second wireless access option; and deciding whether or not to associate with the first wireless access option at least partly on the basis of the determination.

20 Claims, 4 Drawing Sheets

(56) References Cited

U.S. PATENT DOCUMENTS

| | | | |
|---|---|---|---|
| 2007/0071016 A1* | 3/2007 | Sadot | H04L 47/10 370/401 |
| 2013/0028305 A1* | 1/2013 | Gollakota | H04J 11/0023 375/219 |
| 2013/0196668 A1* | 8/2013 | Bu | H04W 36/14 455/437 |

* cited by examiner

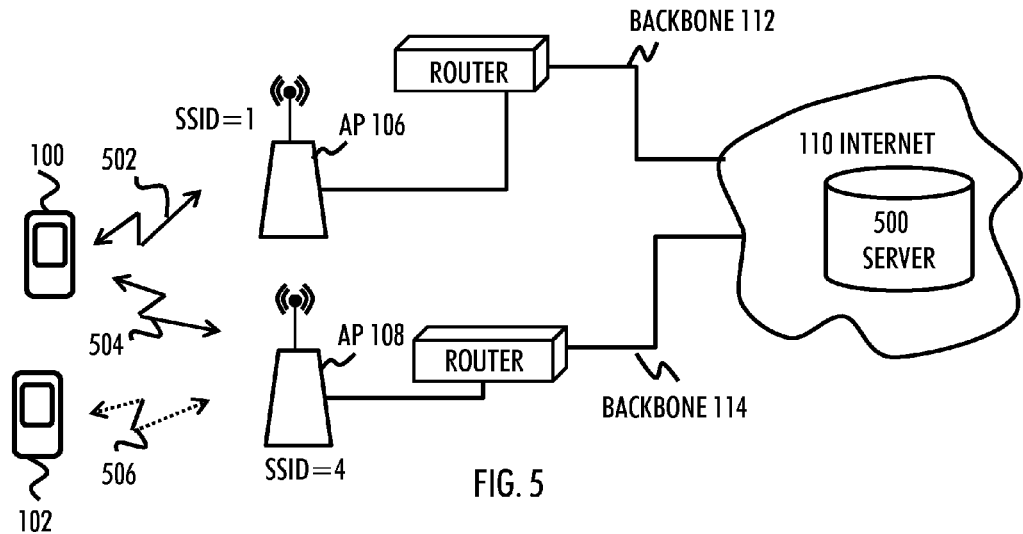
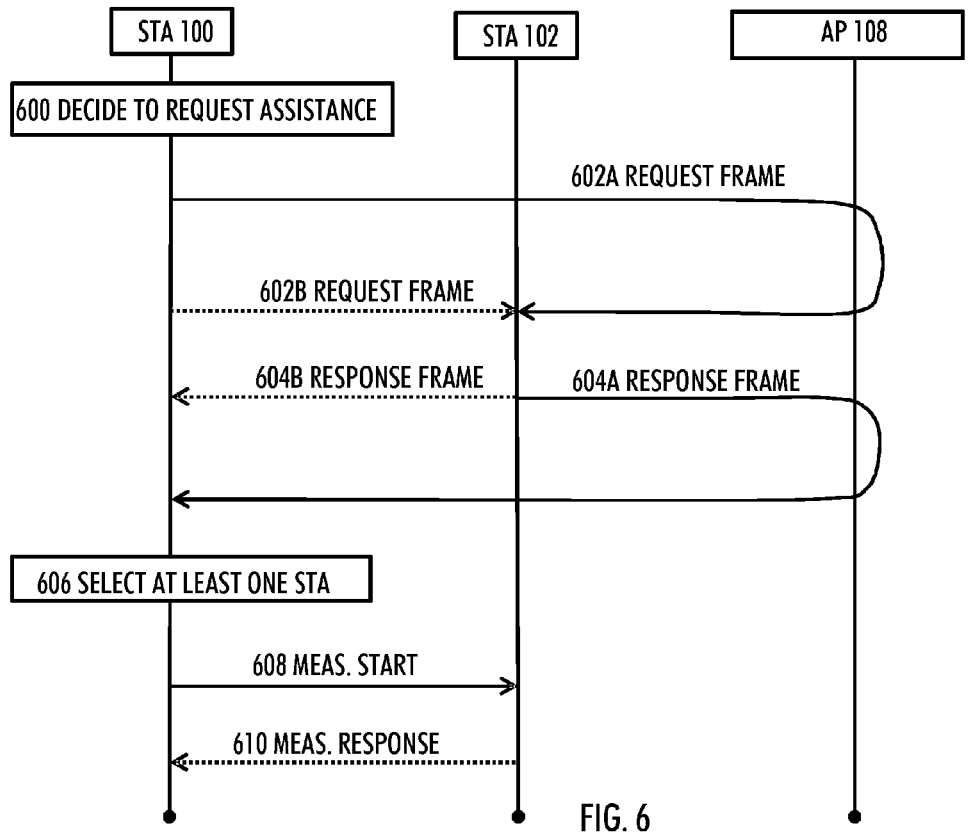

IMPROVING COMMUNICATION EFFICIENCY

FIELD

The invention relates generally to wireless communication networks. More particularly, the invention relates to improving communication efficiency in a case where a user terminal may connect to several wireless access nodes or networks simultaneously.

BACKGROUND

For wireless communications, there are different technologies and network types, comprising different kinds of long range and short range networks. It may also be that a single device may connect to several access nodes at the same time. In this way multiple paths may be generated for the communication.

BRIEF DESCRIPTION OF THE INVENTION

In an example of an embodiment, a method is disclosed that includes detecting, by an apparatus, a first wireless access node while the apparatus is associated with a second wireless access node; determining whether or not a first connection to a server via the first wireless access node shares at least part of a backbone with a second connection to the server via the second wireless access node; deciding whether or not to associate with the first wireless access node at least partly on the basis of the determination, and maintaining the association with the second wireless access node if an association with the first wireless access node is established.

In an example of an embodiment, a method is disclose that includes determining, by a network node, whether or not a first connection to a server via a first wireless access node and a second connection to the server via a second wireless access node share at least part of a backbone, and causing a transmission of a message to a user terminal associated with the second wireless access node comprising information on the determination result for causing the user terminal to determine whether to establish association with the first wireless access node and to maintain the association with the second wireless access node.

In an example of an embodiment, an apparatus is disclosed that includes at least one processor and at least one memory including a computer program code, wherein the at least one memory and the computer program code are configured, with the at least one processor, to cause the apparatus at least to: detect a first wireless access node while the apparatus is associated with a second wireless access node; determine whether or not a first connection to a server via the first wireless access node shares at least part of a backbone with a second connection to the server via the second wireless access node; decide whether or not to associate with the first wireless access node at least partly on the basis of the determination, and maintain the association with the second wireless access node if an association with the first wireless access node is established.

In an example of an embodiment, an apparatus is disclosed that includes at least one processor and at least one memory including a computer program code, wherein the at least one memory and the computer program code are configured, with the at least one processor, to cause the apparatus at least to: determine whether or not a first connection to a server via a first wireless access node and a second connection to the server via a second wireless access node share at least part of a backbone, and cause a transmission of a message to a user terminal associated with the second wireless access node comprising information on the determination result for causing the user terminal to determine whether to establish association with the first wireless access node and to maintain the association with the second wireless access node.

Embodiments of the invention are defined in the dependent claims.

LIST OF DRAWINGS

In the following, the invention will be described in greater detail with reference to the embodiments and the accompanying drawings, in which FIG. 1 presents a network, according to an embodiment;

FIGS. 2 to 4, 6 and 7 show methods according to some embodiments;

FIG. 5 shows scenarios for measuring the backbone performance, according to some embodiments.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

The number of IEEE 802.11-enabled mobile devices is ever increasing. The IEEE 802.11 is a set of standards for implementing wireless local area network (WLAN), also known as the Wi-Fi. Such an IEEE 802.11-enabled station (STA), such as the user terminals 100 to 102 in FIG. 1, may associate with one or more access points (APs) 104, 106, and 108. The STA 100 to 102 may comprise a mobile phone, a palm computer, a wrist computer, a laptop, a personal computer, or any device capable to access the wireless radio access network, such as the WLAN. The access points 104 to 108 may be WLAN base stations, for example.

Figure 1:
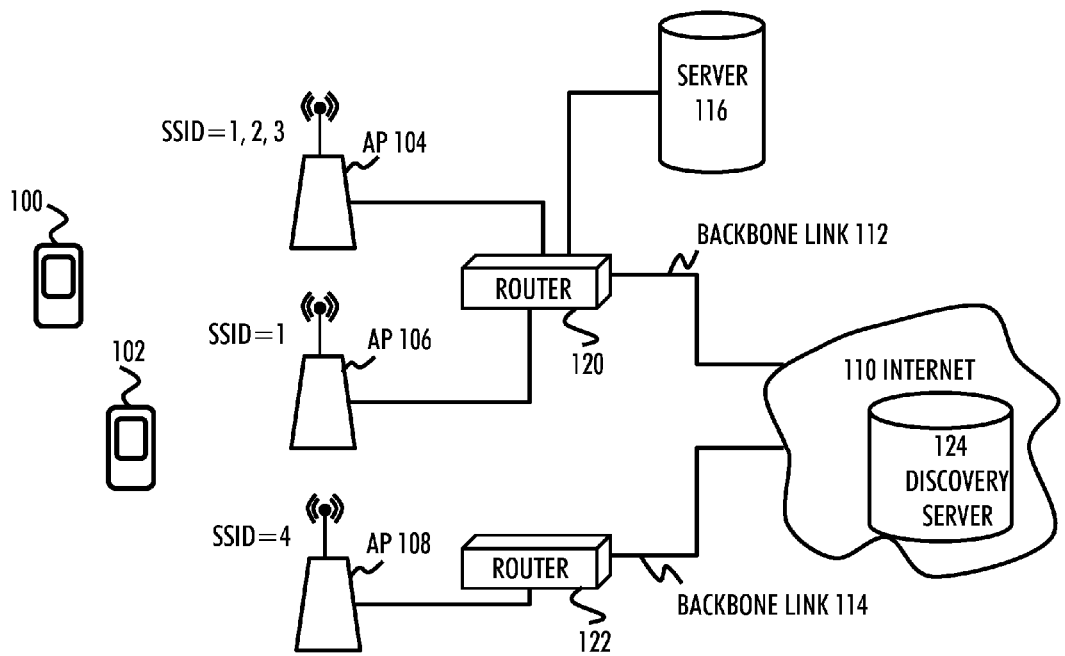

Some APs or AP devices 102 to 108 may be capable to physically co-locate multiple networks, e.g. the same AP may offer multiple networks with the same hardware. Each network may have own unique service set identifier (SSID), such as "1", "2", and "3" for an AP 104 as shown in FIG. 1. Each AP 104 to 108 is typically connected to the Internet 110 with a single backbone connection 112. Further, the AP 104 may be located at a single location and the AP 104 may operate on multiple channels. In different frequencies the performance of the AP 104 may differ, but not as much as if many AP devices were present to offer the multiple networks. In addition to this, there are network topologies, such as in homes or in shop/restaurants, in which multiple AP devices are connected through the same backbone to the Internet 110. In such case, multiple AP devices share the same, common backbone data delivery capacity to the Internet 110. For example, in FIG. 1, the APs 104 and 106 are sharing the same link 112 to the Internet 110, but the APs 104 and 108 are connected through different backbone links 112 and 114, respectively, to the internet 110.

As shown, the APs 104 to 108 may be connected to the Internet 110 and/or to a local server 116 via routers/switches 120 and 122. In these cases, the throughputs of Internet traffic and local server traffic may differ. Typically, the throughput to the local server is limited by the air interface performance between the APs 104 to 108 and the STAs 100 to 102, whereas the Internet throughput is limited by the backbone link 112/114 capacity. For instance, the APs 104 and 106 are connected to the same local server 116 via the router/switch 120. The data throughput to the server 116 is not limited by the Internet backbone throughput.

As indicated earlier, the hosts' or STAs' 100 to 102 wireless radios may support and maintain concurrent associations to at least two APs 104 to 108. The concurrent associations may enable the STAs 100 to 102 to select among a larger set of transmission paths and help in handovers (HOs). The operation with multiple paths may improve traffic delivery reliability, e.g. when the air interface links to the APs 104 to 108 are weak. The use of simultaneous associations may also increase the throughput, e.g. when the backbone links 112/114 are the bottlenecks of the transmission capacity. Indeed, there may be cases where the transmission capacities of the wireless access networks "1", "2", "3", and "4" are higher than the throughput of the backbone network 112/114 that connects the wireless networks to the Internet 110. Therefore, it may be assumed that the bottleneck is in wired lines 112/114 (e.g. such as in the Asymmetric Digital Subscriber Line (ADSL) modem link). In order to increase the throughput, the terminals 100 to 102 may establish a new link/association to another wireless access network "1", "2", "3", and/or "4" or to another wireless access point 104 to 108. However, it may be that throughput is not increased via this approach. The reason may be that the two access networks, such as wireless access networks "1" and "2", or two APs, such as APS 104 and 106, share the same bottleneck backbone link 112.

In order to optimize the STAs' 100 to 102 operation and efficiency, it is proposed that the STA (e.g. such as the STA 100) utilizes a backbone topology and throughput information in deciding whether parallel associations to multiple wireless access options (e.g. to multiple APs 104 to 108) increase also the throughput in addition to improving the reliability. As a result, the STA 100 may decide whether to associate to another AP and/or which operation mode to use in the new association.

Figure 2:
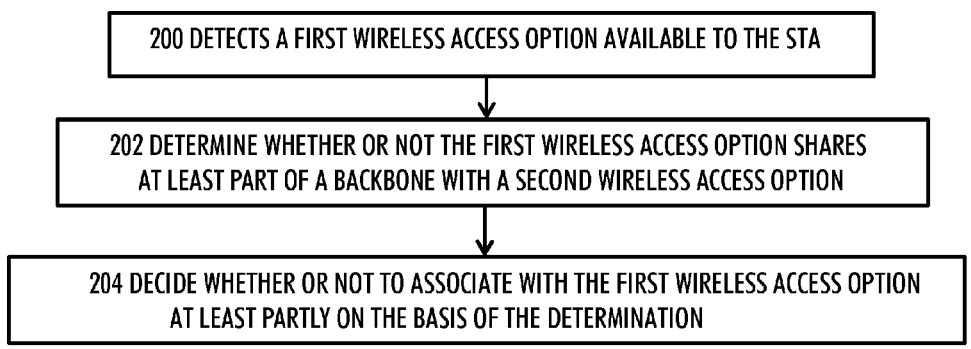

As shown in FIG. 2, it is proposed that the STA 100 detects in step 200 a first wireless access option. This may happen by detecting the beacon transmitted by an access point of the first wireless access option, for example. Further, a specific database may download to STA's 100 memory the identifiers of the APs 104 to 108 to which the terminal 100 is allowed to associate. For instance, the Access Network Detection and Selection Function (ANDSF) define a set of parameters that may restrict the access to some APs/networks. The identifiers may be used as to select the AP 104 to 108 for association. The server specific database system may also provide information of the APs 104 to 108 that are available at specific locations. This information may also include main operating parameters, such as versions of the radio system, its capabilities, information regarding the applied backbone, etc.

Thereafter, in step 202, the STA 100 further determines whether or not the first wireless access option shares at least part of a backbone with a second wireless access option. In an embodiment, the shared (common) at least part of the backbone comprises a bottleneck 112/114 to the Internet 110. The determination in step 202 may be done in a plurality of manners, as will be described later.

In an embodiment, the first and second wireless access options correspond to a same wireless access network, such as the network with the SSID="1", provided by two different access points, such as APs 104 and 106. Although not shown in FIG. 1, these APs providing the same wireless access network may have different internet backbones. For instance, one of the APs is connected to first ADSL, while the other of the two APs is connected to a second ADSL. A basic service set identifier (BSSID) may identify the AP for the STA 100. The BSSID may be the medium access control (MAC) address of the respective AP.

In another embodiment, the first and second wireless access options correspond to different wireless access networks, such as the networks with SSIDs="1" and "2" provided by a same AP, such as the AP 104, or by different APs. An example of the latter case in which different wireless access networks are provided by different APs may be, as shown in FIG. 1, a case where the AP 104 offers the network with SSID="1" and the AP 108 offers the network with SSID="4". In an embodiment, even though being provided by the same AP, the backbone paths to the Internet 110 may be different, depending on the network configurations. For example, one wireless access network may have access to more sites and use different routers, etc. In an embodiment, the wireless access networks share the at least part of the same bottleneck backbone link 112/114.

In an embodiment, the wireless access network may be the WLAN. In an embodiment, the wireless access network may be a cellular network, such as the Long Term Evolution (LTE) or the LTE-Advanced (LTE-A) of the 3$^{rd}$ Generation Partnership Project (3GPP). In general, the concept of the wireless access network is to be considered broadly. It should be noted that some STAs may implement both the cellular LTE/LTE-A radio and the WLAN radio. Further, both of the cellular and WLAN networks may be connected with the same or different backbone link 112/114 to the Internet 110.

In an embodiment, the first and second wireless access options may correspond to different radio access technologies (RATs). For example, the first wireless access option may use WLAN, whereas the second wireless access option applies a cellular RAT, such as one of the following: Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), LTE, and/or LTE-A.

Finally, in step 204, the STA 100 decides whether or not to associate with the first wireless access option at least partly on the basis of the determination. If it is determined that the wireless access options share at least part of the same backbone/transport link 112/114 to the Internet, the concurrent association with both of the wireless access options may not improve the total throughput of the STA 100. For the STA 100, which is capable to operate concurrently in multiple APs 104 to 108 (including multiple WLAN APs, but also APs mixing different access technologies, such as WLAN and cellular 3GPP radios), it may be beneficial to select a set of APs 104 to 108 that provide the best performance. Therefore, a discovery mechanism for detecting the APs 104 to 108 to associate with may take into account the backbone link 112/114 performance of the APs 104 to 108. The determination of the APs 104 to 108 to associate with may thus consider whether the backbones 112 and 114 are dependent (e.g. the AP 104 is sharing the same backbone link 112 with the AP 106 and possibly with a femtocell, such as Home NodeB or Home eNodeB) or independent (e.g. the AP 108 has individual backbone connection 114 to the Internet 110).

In an embodiment, the STA 100 may further detect the second wireless access option, possibly via beacon signals corresponding to the second wireless option.

In an embodiment, the STA 100 is associated to/with the second wireless access option while detecting the first wireless access option. Let us in the following imagine that the STA 100 is currently associated to the SSID "1" provided by the AP 104 (i.e. the AP 104/SSID "1" is the second wireless access option). The first wireless option may in such case be a network provided by the other two APs 106 and 108, or the networks with SSID "2" or "3" provided by the AP 104, for example.

Imagine further that the STA 100 detects the wireless access options provided by the APs 106, which share at least part of the same backbone. As such, the shared, common backbone link 112 may limit the total throughput of the STA 100 and the total throughput of the STA 100 may not be increased by associating to/with both of the APs 104 and 106 having the same backbone link 112. On the other hand, if the available wireless access options do not share the same backbone, as is the case with the APs 104 and 108, then it may be beneficial to associate to the AP 108 in addition to the AP 104.

Figure 3:
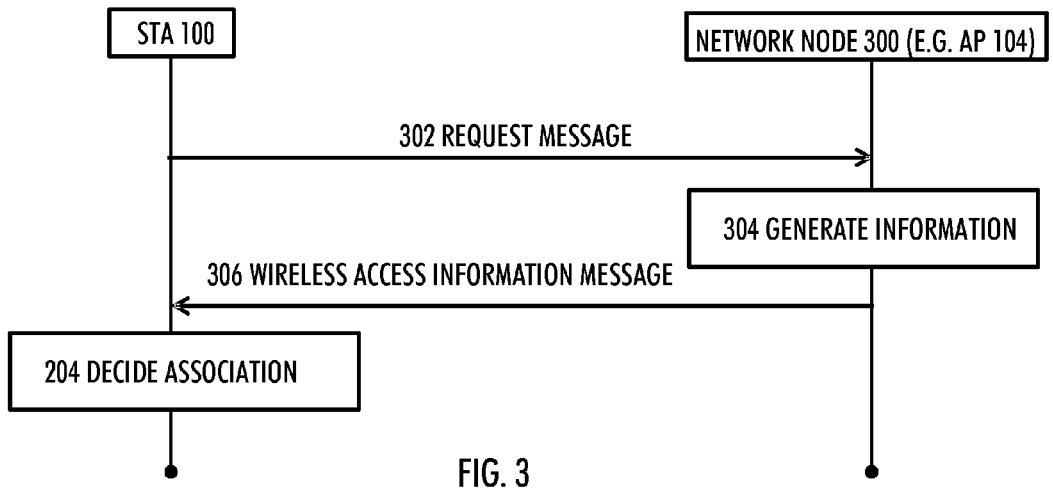

Let us now consider how the STA 100 may determine are the two or more wireless access options sharing the backbone/transport link 112/114. In an embodiment, as shown in FIG. 3, the STA 100 may transmit a request message 302 to a network node 300, wherein the request message 302 is for receiving a wireless access information message 306 from the network node 300. The wireless access information message may be used by the STA 100 for determining whether or not to associate to the first wireless access option, as will be described.

However, it should be noted that, in an embodiment, the STA 100 may receive the wireless access information message 306 without placing the request 302 first. The wireless access information message 306 may be present in the beacon or other broadcasted frame that is transmitted without any request. Therefore, the transmission of the request message 302 is optional.

The network node 300 may comprise at least one of an access point, such as one of the APs 104 to 108, a base station, a Node B, an evolved NodeB, and a server, such as the server 116 or a specific "discovery" server 124 capable of aiding the STA 100 in its association decision. Further, in an embodiment, each AP 104 to 108 may be configured to forward the request to the discovery server 124, if such exists. As one example, it may be mentioned that the STA 100 may send, e.g., a Generic Advertisement Service (GAS) —request with a specific Access Network Query Protocol (ANQP), or other protocol payload. The discovery server 124 may be configured by the network operator, for instance, and the STA 100 may not be aware of the specific server 124 that responses to the request message 302.

In an embodiment, the discovery server 124 may be in the Internet 110, or it may be in one of the APs 104 to 108. Further, it should be noted that different APs 104 to 108 may use different discovery servers. However, for the sake of simplicity, let us consider that the discovery server 124 is in the Internet as depicted in FIG. 1 with reference numeral 124.

In an embodiment, the STA 100 may retransmit the request message 300 if the first response obtained does not comprise the information needed by the STA 100. E.g. it may be that the response does not carry information regarding the backbone link(s) 112/114 which is relevant to the first and second wireless access options. For example, the STA 100 may transmit the request message 302 first to the AP 104 and, if the information message 306 received as a response is not clear or sufficient, the STA 100 may issue a new request message 302 through another AP 106/108.

In an embodiment, the server, to which the request message 302 is transmitted to, is selected by the STA 100. It may even be that the APs 104 to 108 are not aware of the existence or address of such server. In an embodiment, the STA 100 may know the internet protocol (IP) address of the discovery server 124 or the uniform resource locator (URL) or uniform resource identifier (URI) of the discovery server 124 and contacts that specific discovery server 124. In one embodiment, the discovery server 124 is hosted in the 3GPP LTE/LTE-A, or in some other cellular network.

The request message 302 may indicate the type of the request. In an embodiment, the request message 302 carries an indication of the currently associated at least one wireless access option, such as the associated AP 104. In an embodiment, the request message 302 carries an indication of the capability to maintain concurrent associations, an indication of a number of maximum concurrent associations (depends on the capabilities of the STA 100), and an indication of a preferred number of concurrent associations. The latter may depend on how much data needs to be transmitted to/from the STA 100, on the capabilities of the STA 100, for example. In an embodiment, the request message 302 carries an indication on whether or not a cellular link of the STA 100 is active. Further, the request message 302 may carry an indication on whether or not the terminal 100 also supports concurrent use of the cellular radio, such as the LTE/LTE-A.

In an embodiment, the request message 302 further request the network node 300 to indicate at least one other wireless access option to be associated to concurrently with the already associated at least one wireless access option. Such wireless option may be the network with SSID="4" via the AP 108, the network with SSID="1" via the AP 106, the network with the SSID="2" or "3" via the AP 104, assuming the current association is to the SSID="1" via the AP 104.

In an embodiment, the request message 302 further requests the network node 300 to indicate the capacity of the different wireless access options in the location. The indicated capacity may comprise a nominal capacity of the relevant backbone links 112/114, the APs' 104 to 108 capability (capacity over the air), and/or the load of the APs 104 to 108. In an embodiment, the capacity may be given in achievable data rate via the least one concurrent association, for example. In an embodiment, the capacity may be given individually for each wireless access option. In an embodiment, the capacity may be given as aggregated capacity for each possible combination of available wireless access option. This may be beneficial as then the STA 10 may more sophistically perform a decision to which wireless access options the STA 100 should associate.

In an embodiment, the request message 302 further requests the network node 300 to indicate or recommend a set of best candidate APs to be associated with or maintained in a stand-by mode in the area of the current location of the STA 100. The criteria for the "best" candidates may be predetermined by the discovery server 124, by the STA 100, and/or by the system.

In an embodiment, the request message 302 further carries an indication of required communication resources. For example, the request message may include information related to applications that are installed in the STA 100 and their data creation and/or reception characteristics. In an embodiment, information of only those applications that are currently running or will be running in the STA 100 may be indicated in the request message 302 302. Any application may provide its characteristics to the controller of the STA 100 through socket options or by separate control signaling. In addition to or alternatively, the STA 100 may monitor data transfer characteristics of the STA 100 and, based on such history knowledge, derive the characteristics of the data usage of the application(s). In addition to or alternatively, the use of configured IP addresses and port numbers may enable acquisition of specific characteristics of the data usage of the application(s). In addition to or alternatively, an installation package framework of the application(s) may contain parameters from where the STA's 100 operating system may derive some data usage characteristics for the application(s). It may be beneficial to indicate the possible data throughput requirements as then the discovery server 124 may more sophisticately propose a set of APs to associate with so that the requirements of the STA 100 may be fulfilled.

In an embodiment, the request message 302 further carries an indication of the location of the STA 100, such as the cell ID of the cell where the STA 100 is at the moment, and/or information related to the movement of the STA 100, such as speed and direction of the movement of the STA 100. This may provide information on available wireless access options for the STA 100.

In an embodiment, the request message 302 further carries an indication of the wireless access option which provides the strongest signal strength, such as the strongest received signal strength indicator (RSSI), or an indication of the wireless option from which the STA 100 expects to receive the best quality link.

In step 304, the network node 300 generates wireless access information which may be used by the STA 100 in determining whether or not to associate to the detected first wireless access option. In an embodiment, the determination may be based on knowledge of the configuration of the wireless access network configurations and topologies. For example, the network node 300, such as one of the APs 104 to 108 or the discovery server 124, may be aware how the routers 120, 122, depicted in FIG. 1, connect to different backbones 112/114 and to different APs 104 to 108. Therefore, the information about how different wireless access options interrelate with each other and how they connect to the Internet 110 may be indicated to the STA 100 in the wireless access information message 306, i.e. in the response message 306. The information provided by the network node 300 may enable the STA 100 to select a more optimal set of the APs 104 to 108 to which they establish concurrent associations.

Alternatively or in addition to generation may be based on measurement performed by the STA 100 or by some other STA, such as the STA 102. In an embodiment, the information, on which the determination in step 304 is based on, is updated on the basis of the measurement results from the STA(s) 100, 102. More information on the application of the measurement information will be described later Thereafter, in step 306, the network node 300, such as the discovery server 124, may transmit the wireless access information message 306 to the STA 100. The wireless access information message 306 may carry parameters and information that are relevant for the STA 100 when it selects a set of APs 104 to 108 for association. The message 306 may carry information on backbone network topology, such as whether or not the first and the second wireless access options share at least part of the same backbone, for example. As a result, the STA 100 may, in step 204, decide regarding the association to/with the first wireless access option.

It may be beneficial to request the response message 306 from the network node 300 as the network node 300 may collect more information of the network performance than a single STA, for example. This information may help to detect possible bottlenecks of the performance (such as the shared backbone link 112). Further, when the response message 306 carrying the relevant information is obtained, the STA 100 need not necessarily use any resources for performing any radio measurements by itself.

In an embodiment, it is enough for the STA 100 to know whether or not the backbone connection 112/114 of the available first wireless access option is likely to limit or increase the total throughput of the data communication or not. The information indicated in the wireless access information message 306 may thus include a backbone IP address or an indication of which APs are connected to the same backbone (such as the APs 104 and 106). For example, the knowledge that the first wireless access option shares at least part of the backbone with the currently operational (i.e. active) second wireless access option may indicate that the first access option is not the optimal selection for association. In such case, the STA 100 may decide not to associate to the first wireless access option as an active link, but to associate to the wireless access option in a stand-by mode and/or to detect another wireless access option to associate to.

In an embodiment, the wireless access information message 306 further carries an indication of a set of at least one wireless access options for the association by the STA 100. Further, the message 306 may indicate a suggested association order for the indicated wireless access options. Let us imagine that the wireless access options correspond to the APs 104 to 108. The suggested order may provide guidance regarding the suitability of the APs 104 to 108 in terms of communication efficiency improvement. For example, if the STA 100 is currently connected to the AP 104 and the message 306 indicates that the APs 104 and 106 share at least part of the same backbone link 112 whereas the APs 104 and 108 apply different backbones links 112 and 114, the indicated order may be such that the AP 108 is suggested before the AP 106 as one possible AP to associate with. The use of such suggestions may reduce the complexity of the terminal implementation and provide means for load balancing to the network. The suggestions may further help to maximize the performance of the STA 100 and avoid signaling overhead, e.g. in cases where the STA 100 is moving and handovers may be performed frequently.

When the first and second wireless access options use the same backbone link 112, the message 306 may further indicate the priority of the wireless access options for resource usage. For example, in a congestion situation, the high priority networks may be allocated a larger portion of the backbone capacity. Therefore, it may make sense for the STA 100 to associate to a high priority wireless access option, rather than to a lower priority wireless access option. The priority of the different wireless access options may be preconfigured information and known by the network node 300 generating the message 306.

Further, in an embodiment, when the backbone link 112/114 connects multiple radio access technologies (RATs), the message 306 may suggest one of the RATs for the device 100. For instance, in congested situations, one RAT may be closed completely in which case association to such RAT may not be beneficial.

In an embodiment, the wireless access information message 306 further carries an indication of the communication performance available through the concurrent association with at least two wireless access options. Some embodiments may also provide information about the estimated throughputs for the uplink (UL) and for the downlink (DL) links. The achievable/available throughput may be determined on the basis of mathematical modeling. It should be noted that the discovery server 124 may acquire knowledge about what the achievable data rates are for each wireless access options, such as for each AP 104 to 108. A physical (PHY) transmission rate (in e.g. Mbit/s) may be set for each transmitted protocol data unit (PDU). For example, the PHY transmission rate may vary from 1 Mbit/s (802.11b) to approximately 1-2 Gbit/s (802.11ac). Further, the backbone routers and/or switches may report congestion situation to the network node 300 (e.g. to the discovery server 124). This congestion information may be used when determining is the highest possible data rate achievable through a given AP 104 to 108 or through a given network SSID, for example. The congestion/utilization information of the backbone network may thus help the discovery server 124 to recommend among the backbone links to the STAs 100, 102.

The response message 306 may further characterize the reason for associating with a certain wireless access option. The reason may state that association with the certain AP may increase the total throughput of the device 100 or that the association with the certain AP may increase the reliability of the communication, for example. The latter may be the case when the total throughput is not increased by adding another association. In such case, the association may still provide more reliability to the communication: if the current association becomes congested or otherwise fails, the new association may be activated from the stand-by mode. Thus, the message 306 may also help the terminal 100 to select should the wireless access option be active (i.e. operational) or maintained only in the stand-by mode.

In an embodiment, the message 306 may also provide how the information carried in the message 306 was obtained (e.g. through measurements or through knowledge of the network configurations) and/or the time when the information which was used as a basis for the message 306 has been acquired. This may enable the STA 100 to determine how up-to-date the information carried in the message 306 is. In case, it is older than a predetermined time limit, the STA 100 may decide to ignore the received message 306. Alternatively, upon detecting that the information stored and used as a basis for generating the message 306 in step 304 is expired, the discovery server 124 may request for an update of the information. This may comprise requesting of an update of at least some measurement results from another network element, such as from one of the STAs 100, 102. In addition to or alternatively, the update of the information may comprise requesting the core network, routers, switches, etc. to update their input which may include network configuration, congestion situations, etc.

Figure 4:
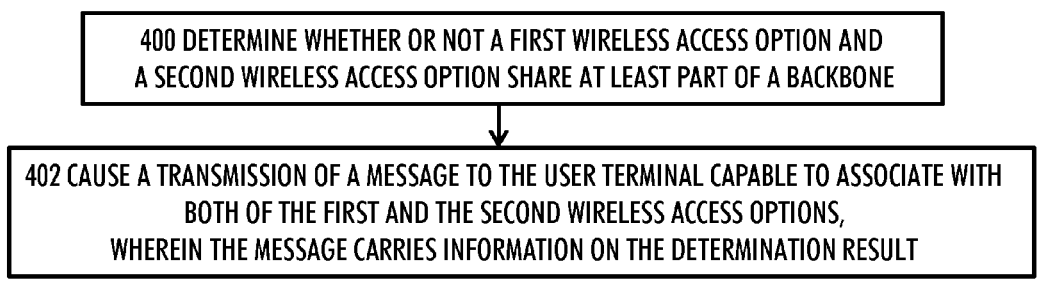

In an embodiment, as shown in FIG. 4, the network node 300, such as one of the APs 104 to 106, the server 116 or any specific "discovery" server, may in step 400 determine whether or not a first wireless access option and a second wireless access option share at least part of the same backbone, such as the backbone link 112/114. The network node 300 may perform the determination on the basis of at least one of the following: configurations of the first and second wireless access options, indicated results of radio measurements performed by at least one device, such as the user terminals 100, 102.

In step 402, the network node 300 may cause a transmission of a message to the user terminal 100 capable to associate with both of the first and the second wireless access options, wherein the message carries information on the determination result. As said, the terminal 100 may then use the received information in determining whether association to only one or both of the wireless access options is to be done. Further, the received information may be used in determining which mode (active or stand-by) to use in the associations, as will be described later.

Let us then look at how the STA 100 may perform the radio (link) measurements. In an embodiment, the STA 100 may also provide at least some of the measurement results to the network node 300. In an embodiment, as shown in FIG. 5 with solid bidirectional arrows 502 and 504, the STA 100 may perform radio measurements, wherein the radio measurements comprise transferring data from a predetermined server 500 through at least one of the first and the second wireless access options. For reasons of clarity, the AP 104 is not depicted in FIG. 5. At least partly on the basis of the performed radio measurements, the STA 100 may determine whether or not the first and the second wireless access options share at least part of the backbone. Thus, in this option, the STA 100 need not necessarily receive the wireless access information message 306 for performing the association decision. For example, when the network node 300 generating the message 306 does not have information for these specific wireless access options in question, the radio measurements performed by the STA 100 may provide the information on whether wireless access options share at least part of the backbone. In an embodiment, the STA 100 makes the radio measurements while being in a pre-association or in an associated state with the corresponding wireless access option.

The radio measurements may comprise throughput and/or capacity measurements. The radio measurements may comprise the terminal 100 requesting DL data from at least one known server 500 and/or transmit UL data to the at least one known server 500 via a specific wireless access option. The known server 500 may locate in the Internet, "behind" the backbone links 112/114.

In one embodiment, during the radio measurements the terminal 100 measures e.g. the transmission rate (in e.g. Mbit/s) and frame transmission success rate and utilization of the air interface. It should be noted that the STA 100 may not offer enough traffic to make the backbone network congested when the air interface is congested, the transmission rate is poor, and/or the transmission is too costly (money or energy-wise). The poor air interface performance may be detected in the UL and in the DL transmissions by monitoring the number of successful transmissions and the transmission rate. If the obtained throughput is close to the rate that is obtainable over the air interface, the STA 100 may consider that the maximum backbone throughput was not yet measured and the STA 100 may consequently repeat the radio measurement via that wireless access option. The obtainable/achievable physical layer (air interface) data transmission rate may be set for each transmitted PDU, as indicated earlier. E.g. if the PHY transmission rate is for instance 6 Mbit/s, the terminal 100 cannot transmit higher amount of traffic to the backbone link 112/114. As a result, the STA 100 may only know that the backbone link 112/114 is capable to transmit traffic at minimum with the rate of 6 Mbit/s. In an embodiment, however, the backbone is faster than possible to measure over the air. In this case it may be determined that the backbone is not forming the bottleneck.

In an embodiment, the radio measurements with respect to a single association are performed first, as shown e.g. with the solid bidirectional arrow 502. If the STA 100 has multiple associations to multiple wireless access options, the STA 100 may repeat the radio measurements of a single association to all of its associations, as shown with the solid bidirectional arrow 504. In an embodiment, the STA 100 may perform the backbone measurements through each of the at least one of the first and the second wireless access options concurrently. In another embodiment the STA 100 may perform the backbone measurements through each of the at least one of the first and the second wireless access options in turns. In order to detect whether the throughput may be increased by adding another active association, the STA 100 may actively split its traffic across the different paths to determine the combination of wireless access options, such as the combination of the APs 104 to 108, which provides the optimal throughput. This may allow for determination of the total throughput through the multiple concurrent associations.

In an embodiment, if the STA 100 detected that the total throughput of the STA 100 decreases when the STA 100 has created a concurrent association to another wireless access option, such as to the AP 106, and started to transmit or receive data with both APs 104 and 106, the STA 100 may consider that the APs 104 and 106 use the same, dependent backbone link 112. In this case the concurrent association with both of the APs 104 and 106 may not improve the throughput of the STA 100. In such case the association to one of the APs 104 or 106 may be dropped or maintained in a stand-by mode. The total throughput measured by the STA 100 represents the accumulated throughput achieved through all the operational associations. In addition, the radio measurements may reveal a prioritization scheme of the wireless access options, such as of the networks with SSIDs "1", "2", ",3", and "4". That is, the network prioritization may provide different throughputs with different network associations, for example, when the systems are loaded.

In an embodiment, the STA 100 implements software for actively and, in purpose, testing the backbone performance and limitation through the radio measurements, as described above. The STA 100 may be a test equipment dedicated to perform such backbone tests, or the STA 100 may use some applications that cause the STA 100 to perform such backbone tests. In an embodiment, the user of the STA 100 may instruct the STA 100 to perform measurements via certain wireless access options.

In an embodiment, the backbone throughput measurements may be performed or aided with other "assisting" devices, such as the STA 102. The measuring device 100 and the assisting device(s) 102 may together produce more traffic to measure high throughput backbone links, for example. Therefore, in an embodiment, the STA 100 performs the radio measurements during at least one other device, such as the 102, causes data transfer 506 via the wireless access option which is under the radio measurements by the STA 100. The other STA 102 may be commanded to perform the data transfer, e.g. by the STA 100 or by another network node 300, such as one of the APs 104 to 108 or the discovery server 124, for example.

In an embodiment, as shown in FIG. 6, the STA 100 may decide in step 600 to request at least one other device, such as the STA 102, to perform radio measurements in which the at least one other STA 102 transfers data 506 from the predetermined server 500 through at least one of the first and the second wireless access networks. The data transmission by the other STA 102 may take place concurrently with the data transmission of the first STA 100. The reason for requesting other STA 102 to perform the measurements may be that the STA 100 does not yet have enough information regarding the wireless access options available.

The assisting STA 102 may be commanded to perform the radio measurement by the discovery server 124, by one of the APs 104 to 108, or by the STA 100 that is associated to the same AP, such as to the AP 108. For example, in an embodiment, the STA 100 may, in step 602A, transmit a request frame to the AP 108 that is broadcasted to all STAs 102 in the BSS corresponding to the AP 108. The request frame may indicate the IP address of the server 500 which is to be used for the radio measurement, the direction (UL/DL) of the radio measurement, and indication of the wireless access option which is to be measured, such as the BSS(s) of the AP(s). In another embodiment, the STA 100 may directly contact the STA 102, as shown with reference numeral 602B, if such radio connection is possible between the two devices 100, 102.

In an embodiment, the request frame may request other STAs 102, that are willing and capable to perform the radio measurements, to transmit an individually addressed response frame to the transmitter 102 of the broadcasted request frame. As shown with dotted line 604B, in an embodiment, the STA 102 may directly respond to the STA 100. If this is not possible or successful, then in one embodiment, the STA 102 may transmit the response frame to the AP 108 as shown with reference numeral 604A. The AP 108 may then broadcast/forward the response frame to the STA 100. The response frame may provide the STA 100 with at least one of the following of the responding STA 102: a medium access control (MAC) address, an IP address, maximum data transmission rate, radio communication capabilities.

Thereafter, on the basis of the response frame(s), the requesting STA 100 may select in step 606 at least one of the devices 102 which accepted the request frame to assist in the radio measurements. The selection may be based on the characteristics of the STA 102, such as the maximum data transmission rate or the radio communication capabilities.

Thereafter, the requesting STA 102 may transmit a measurement start frame to the assisting device(s) 102 in step 608. Such backbone measurement start frame may contain an indication of the wireless access option that the assisting STA 102 is to measure, such as the BSS of the APs 106 and 108, the measurement start time and/or the measurement duration, for example. Thereafter, the assisting device 102 may perform the data transfers to/from the predetermined server 500 via the AP 108, for example.

In an embodiment, the STA 100 may inform the at least one device 102 causing the data transfer about certain restrictions for causing the data transfer. For example, the restrictions may indicate that the at least one device 102 is to start the data transfer after a predetermined delay. In this embodiment, the STA 100 may request the assisting device 102 to start its transmissions/DL reception later than the STA 100. In this operation, the STA 100 may measure how the obtained throughput changes when the assisting device starts its own transmissions.

In an embodiment, the STA 100 may command the assisting device 102 to transmit/receive bursts of traffic. In this operation the STA 100 may detect is its performance varying based on the bursty traffic. Similarly, in an embodiment, the STA 100 may command the assisting device to increase/decrease gradually its throughput and the STA 100 may try to detect when its throughput is affected by the transmissions of the assisting device. If the performance/throughput changes due to the assisting device operation, the STA 100 may assume that the backbone is at least partially using the same bottleneck.

In an embodiment, the assisting device 102 may further transmit a backbone measurement information message 610 to the STA 100, wherein the backbone measurement information message 610 carries at least some results of the radio measurement performed by the STA 102. The STA 100 receiving the backbone measurement information message 610 may then determine whether or not the first and the second wireless access options share at least part of the backbone at least partly on the basis of the received measurement information message.

In an embodiment, the STA 100 and/or the STA 102 may also report the measurement results to the network node 300, such as to the discovery server 124, so as to allow the discovery server 124 to update its database regarding different wireless access options, for example. The STA(s) 100, 102 may report the obtained throughput from the different associations when applying single associations and/or when applying multiple concurrent associations. The report may also comprise the association setup times to different wireless access options. The network node 300 may use the updated information e.g. later for assisting other devices which are requesting backbone performance information from the network node 300.

In an embodiment, the STA may be offering the services of an AP. Such STA may, furthermore, by its own, periodically make performance measurements of its UL access.

It should be noted that possible multiple concurrent associations may be maintained differently than only a single association. When the STA 100 has multiple concurrent associations to maintain connectivity to the Internet 110, at least one link may be maintained in an active (i.e. operational) mode while other associations may be maintained in stand-by mode or in the active mode. The selected connectivity mode in the association may depend on the terminal's 100 traffic load, network congestion and/or the end-to-end traffic delivery (Internet backbone) performance and sharing.

Figure 7:
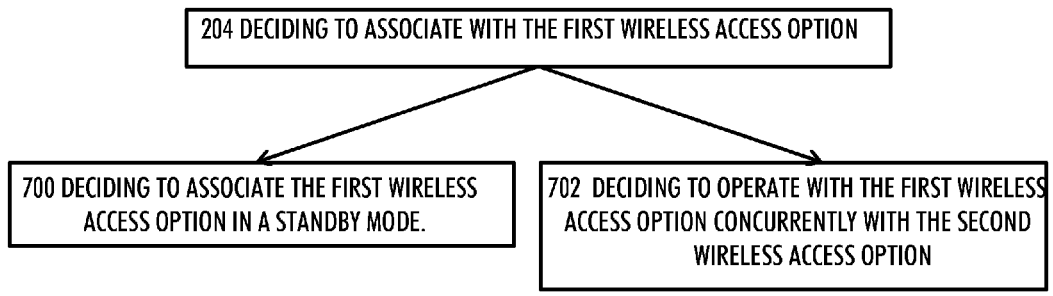

In an embodiment, as shown in FIG. 7, the STA 100 may then decide in step 204 to associate to the first wireless access option, such as to the network with the SSID "4" via the AP 108. Thereafter, in step 700, the STA 100 may further decide to associate the first wireless access option in the standby mode. As said, the STA 100 may acquire information on whether two wireless access options share the same (bottleneck) transport/backbone link, such as the link 112. If yes, then adding another path with the same bottleneck link 112 may not be beneficial from the point of view of the throughput at least. In some cases adding another active association may even decrease the throughput as experienced by the STA 100. In such case, the path may be added in the standby mode to increase the reliability of the communication while applying another wireless access option for data transfer. Further, if the traffic load of the STA 100 is not high, then maintaining two associations in the active mode may not be needed.

In an embodiment, however, as the STA 100 detects that data transfer performance of a currently active wireless access option degrades, the STA 100 may decide to change the stand-by mode of the first wireless access option into the active mode in order to perform data transfer via the first wireless access option. This may be beneficial from the point of view of the data transfer efficiency. For example, when the currently active wireless access option shows congestion or poor air interface, it may be better to switch to start transferring data via the first wireless access option that is currently in the stand-by mode. The previously active wireless access option may be maintained in active mode, changed into the stand-by mode or dropped.

When the association is maintained in stand-by mode, the link is ready for, e.g. authentication, association and IP addresses are created, but the terminal has not directed traffic to the link. These preparations speed-up the transition and avoid delays to take the stand-by link into use. However, in another embodiment, the STA 100 may in step 702 decide to operate with the first wireless access option in active mode concurrently with the second wireless access option. This may be the case when the acquired information indicates that the backbones 112 and 114 are independent of each other, for example. Further, in cases where a single well-performing association is not available, the STA 100 may maintain more active associations. Examples of not well-performing associations may comprise associations where the transmissions are not successful or the air interface reliability is poor. In this case the terminal 100 may maintain multiple links and get retransmissions of the DL traffic or to select the UL link that offers the best performance. Multiple associations in this case enable the use of the both links and the variation of the link performance may be measured and detected immediately. This operation may reduce the delay to make handovers and multiple transmissions increase the probability of the successful transmissions. A further example of not well-performing association may comprise an association where the backbone throughput is not acceptable to meet the customer or application expectations. This may be detected when the over-the-air transmission rates are high and the data transmission over-the-air takes a small percentage of the total available time. In this case, the wireless access options that are concurrently associated should not share the same backbone, because the total capacity may be increased through independent backbone links.

The proposed solution for selecting the wireless access options, such as AP(s) 104 to 108, for concurrent associations and for deciding on the association maintenance/operation modes when the terminal is capable to operate with concurrent associations may advantageously make the use of the concurrent associations faster and avoid unnecessary/unsuccessful associations.

Figure 8:
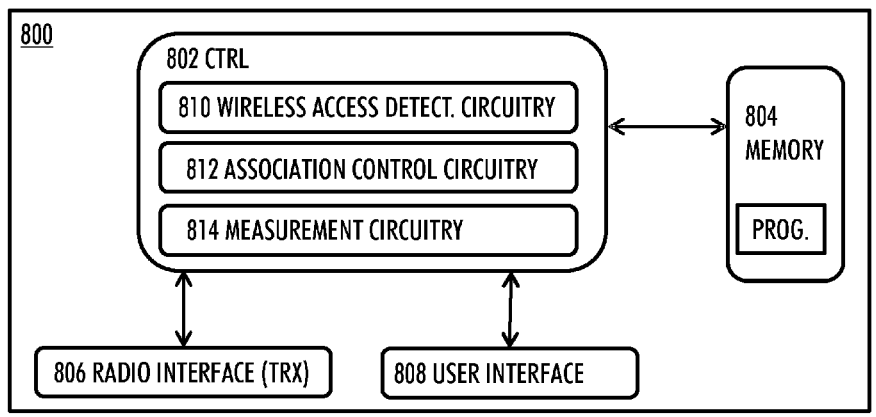
FIGS. 8 and 9 illustrate apparatuses, according to some embodiments.
Figure 9:
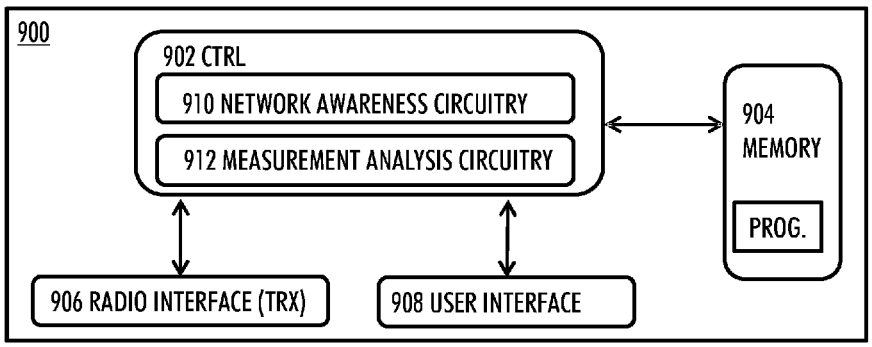

FIGS. 8 and 9 provide apparatuses 800 and 900 comprising a control circuitry (CTRL) 802 and 902, such as at least one processor, and at least one memory 804 and 904 including a computer program code (PROG), wherein the at least one memory and the computer program code (PROG), are configured, with the at least one processor, to cause the respective apparatus to carry out one or more of the embodiments described.

The apparatuses 800 and 900 may further comprise communication interfaces (TRX) 806 and 906 comprising hardware and/or software for realizing communication connectivity according to one or more communication protocols. The TRX may provide the apparatus with communication capabilities to access the wireless local area network, or a cellular network, for example.

The apparatuses 800 and 900 may also comprise user interfaces 808 and 908 comprising, for example, at least one keypad, a micro-phone, a touch display, a display, a speaker, etc. Each user interface may be used to control the respective apparatus by the user.

In an embodiment, the apparatus 800 may comprise the terminal device of a cellular communication system, e.g. a user equipment (UE), a user terminal (UT), a computer (PC), a laptop, a tabloid computer, a cellular phone, a mobile phone, a communicator, a smart phone, a palm computer, or any other communication apparatus. Alternatively, the apparatus 800 is comprised in such a terminal device. Further, the apparatus 800 may be or comprise a module (to be attached to the apparatus) providing connectivity, such as a plug-in unit, an "USB dongle", or any other kind of unit. The unit may be installed either inside the apparatus or attached to the apparatus with a connector or even wirelessly. In an embodiment, the apparatus 800 may be, comprise or be comprised in a user terminal, such as the STA 100.

The control circuitry 802 may comprise a wireless access detection circuitry 810 for detecting the existence of a wireless access option, such as detecting a wireless access network or a wireless access point. An association control circuitry 812 may be for determining whether or not to associate to the wireless access option(s) and, if yes, whether to use an active or the stand-by mode for the association(s). A measurement circuitry 814 is for performing the radio measurements, such as throughput measurements, or requesting other STAs to assist in the measurements, according to any of the embodiments In an embodiment, the apparatus 900 may be or be comprised in a network node 300, such as in one of the APs 104 to 108 or in a specific server in the network. The control circuitry 902 may comprise a network awareness circuitry 910 for detecting and acquiring knowledge of the topology and configuration of the networks. For example, the application of specific backbone connections by different routers/switches may be detected. The congestion situation in the networks may be monitored as well. A measurement analysis circuitry 912 may be for analysing radio measurement results provided by different STAs. The results may be used for updating the information of the networks, for example.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
    detecting, by an apparatus, a first wireless access node while the apparatus is associated with a second wireless access node;
    determining whether or not a first connection to a server via the first wireless access node shares at least part of a backbone with a second connection to the server via the second wireless access node;
    deciding whether or not to associate with the first wireless access node at least partly on the basis of the determination; and
    maintaining the association with the second wireless access node if an association with the first wireless access node is established.

2. The method of claim 1, further comprising:
    causing a reception of a wireless access information message from a network node, the wireless access information message carrying an indication on whether or not the first and the first connection and the second connection share at least part of the backbone; and determining whether or not the first and the second the first connection and the second connection share at least part of the backbone at least partly on the basis of the wireless access information message.

3. The method of claim 2, wherein the network node comprises at least one of an access point, a base station, a Node B, and an evolved node B.

4. The method of claim 1, further comprising:
performing radio measurements for determining whether or not the first connection and the second connection share at least part of the same backbone, wherein the radio measurements comprise transferring data from at least one predetermined server through at least one of the first and the second wireless access nodes; and
determining whether or not the first and the second connections share at least part of the backbone at least partly on the basis of the radio measurements.

5. The method of claim 1, further comprising: upon deciding to associate with the first wireless access node, deciding to associate the first wireless access node in a standby mode while applying another wireless access node for data transfer.

6. The method of claim 1, further comprising: upon deciding to associate with the first wireless access node, deciding to operate with the first wireless access node and the second wireless access node concurrently in an active mode in order to increase throughput.

7. The method of claim 1, wherein the first and second wireless access nodes correspond to a same wireless access network provided by two different access points.

8. The method of claim 1, wherein the first and second wireless access nodes correspond to different wireless access networks provided by a same access point or by different access points.

9. The method of claim 1, wherein the first wireless access node corresponds to a wireless local area network.

10. A method, comprising:
determining, by a network node, whether or not a first connection to a server via a first wireless access node and a second connection to the server via a second wireless access node share at least part of a backbone; and
causing a transmission of a message to a user terminal associated with the second wireless access node comprising information on the determination result for causing the user terminal to determine whether to establish association with the first wireless access node and to maintain the association with the second wireless access node.

11. An apparatus, comprising:
at least one processor and at least one memory including a computer program code, wherein the at least one memory and the computer program code are configured, with the at least one processor, to cause the apparatus at least to:
detect a first wireless access node while the apparatus is associated with a second wireless access node;
determine whether or not a first connection to a server via the first wireless access node shares at least part of a backbone with a second connection to the server via the second wireless access node;
decide whether or not to associate with the first wireless access node at least partly on the basis of the determination; and
maintain the association with the second wireless access node if an association with the first wireless access node is established.

12. The apparatus of claim 11, wherein the at least one memory and the computer program code are configured, with the at least one processor, to cause the apparatus further to:
cause a reception of a wireless access information message from a network node, the wireless access information message carrying an indication on whether or not the first connection and the second connection share at least part of the backbone; and
determine whether or not the first connection and the second connection share at least part of the backbone at least partly on the basis of the wireless access information message.

13. The apparatus of claim 12, wherein the network node comprises at least one of an access point, a base station, a Node B, and an evolved node B.

14. The apparatus of claim 11, wherein the at least one memory and the computer program code are configured, with the at least one processor, to cause the apparatus further to:
perform radio measurements for determining whether or not the first and the second wireless access nodes share at least part of the same backbone, wherein the radio measurements comprise transferring data from at least one predetermined server through at least one of the first and the second wireless access nodes; and
determine whether or not the first and the second wireless access nodes share at least part of the backbone at least partly on the basis of the radio measurements.

15. The apparatus of claim 11, wherein the at least one memory and the computer program code are configured, with the at least one processor, to cause the apparatus further to:
upon deciding to associate with the first wireless access node, decide to associate the first wireless access node in a standby mode while applying another wireless access node for data transfer.

16. The apparatus of claim 11, wherein the at least one memory and the computer program code are configured, with the at least one processor, to cause the apparatus further to:
upon deciding to associate with the first wireless access node, decide to operate with the first wireless access node in an active mode concurrently with the second wireless access node in order to increase throughput.

17. The apparatus of claim 11, wherein the first and second wireless access nodes correspond to a same wireless access network provided by two different access points.

18. The apparatus of claim 11, wherein the first and second wireless access nodes correspond to different wireless access networks provided by a same access point or by different access points.

19. The apparatus of any of claim 11, wherein the first wireless access node corresponds to a wireless local area network.

20. An apparatus, comprising:
at least one processor and at least one memory including a computer program code, wherein the at least one memory and the computer program code are configured, with the at least one processor, to cause the apparatus at least to:
determine whether or not a first connection to a server via a first wireless access node and a second connection to the server via a second wireless access node share at least part of a backbone; and
cause a transmission of a message to a user terminal associated with the second wireless access node comprising information on the determination result for causing the user terminal to determine whether to establish association with the first wireless access node and to maintain the association with the second wireless access node.

* * * * *